US011040594B2

(12) United States Patent
Chen et al.

(10) Patent No.: US 11,040,594 B2
(45) Date of Patent: Jun. 22, 2021

(54) HVAC DRIVER-FOCUS MODE OPERATION MECHANISM

(71) Applicant: DENSO International America, Inc., Southfield, MI (US)

(72) Inventors: Siyue Chen, Northville, MI (US); Brian Belanger, Farmington Hills, MI (US)

(73) Assignee: DENSO International America, Inc., Southfield, MI (US)

(\*) Notice: Subject to any disclaimer, the term of this patent is extended or adjusted under 35 U.S.C. 154(b) by 303 days.

(21) Appl. No.: 16/136,331

(22) Filed: Sep. 20, 2018

(65) Prior Publication Data

US 2019/0152289 A1 May 23, 2019

Related U.S. Application Data

(60) Provisional application No. 62/589,799, filed on Nov. 22, 2017.

(51) Int. Cl.
*B60H 1/00* (2006.01)
*B60H 1/24* (2006.01)

(52) U.S. Cl.
CPC ....... *B60H 1/00842* (2013.01); *B60H 1/0055* (2013.01); *B60H 1/00064* (2013.01); *B60H 1/00285* (2013.01); *B60H 1/00564* (2013.01); *B60H 1/00664* (2013.01); *B60H 1/00678* (2013.01); *B60H 1/242* (2013.01); *B60H 2001/00092* (2013.01); *B60H 2001/00192* (2013.01)

(58) Field of Classification Search
CPC ............ B60H 1/00842; B60H 1/00678; B60H 1/00064; B60H 1/00285; B60H 1/0055; B60H 1/00664; B60H 1/242; B60H 2001/00092; B60H 2001/00192
USPC ........................................................ 454/139
See application file for complete search history.

(56) References Cited

U.S. PATENT DOCUMENTS

2005/0126774 A1\* 6/2005 Yamaguchi ........ B60H 1/00021
165/204
2011/0284183 A1\* 11/2011 Yamashita ......... B60H 1/00678
165/63

(Continued)

FOREIGN PATENT DOCUMENTS

JP 2010228584 A \* 10/2010

*Primary Examiner* — Steven B McAllister
*Assistant Examiner* — Charles R Brawner
(74) *Attorney, Agent, or Firm* — Harness, Dickey & Pierce, P.L.C.

(57) ABSTRACT

A heating, ventilation, and air conditioning (HVAC) airflow distribution module is integrated with a driver-focus mode operation mechanism for a vehicle. The module utilizes: a driver face door to control airflow through driver face outlets; a passenger face door sub assembly to control airflow through a passenger center face outlet and a passenger side face outlet independently; a foot door sub assembly including a passenger front foot door and a main foot door to control airflow through a passenger front foot outlet independently from driver front and rear foot outlets and a passenger rear foot outlet; and a separator to separate airflow through passenger front and rear foot outlets. The present disclosure enables an HVAC airflow distribution module to focus airflow on the driver's seat and maintain the vehicle recirculation at a comfortable level when no passenger is present.

13 Claims, 6 Drawing Sheets

(56) References Cited

U.S. PATENT DOCUMENTS

2012/0142264 A1* 6/2012 Sagou ................ B60H 1/00842
 454/75
2016/0039261 A1* 2/2016 Akahane ............ B60H 1/00528
 165/203
2018/0037087 A1* 2/2018 Cengil ............... B60H 1/00842

* cited by examiner

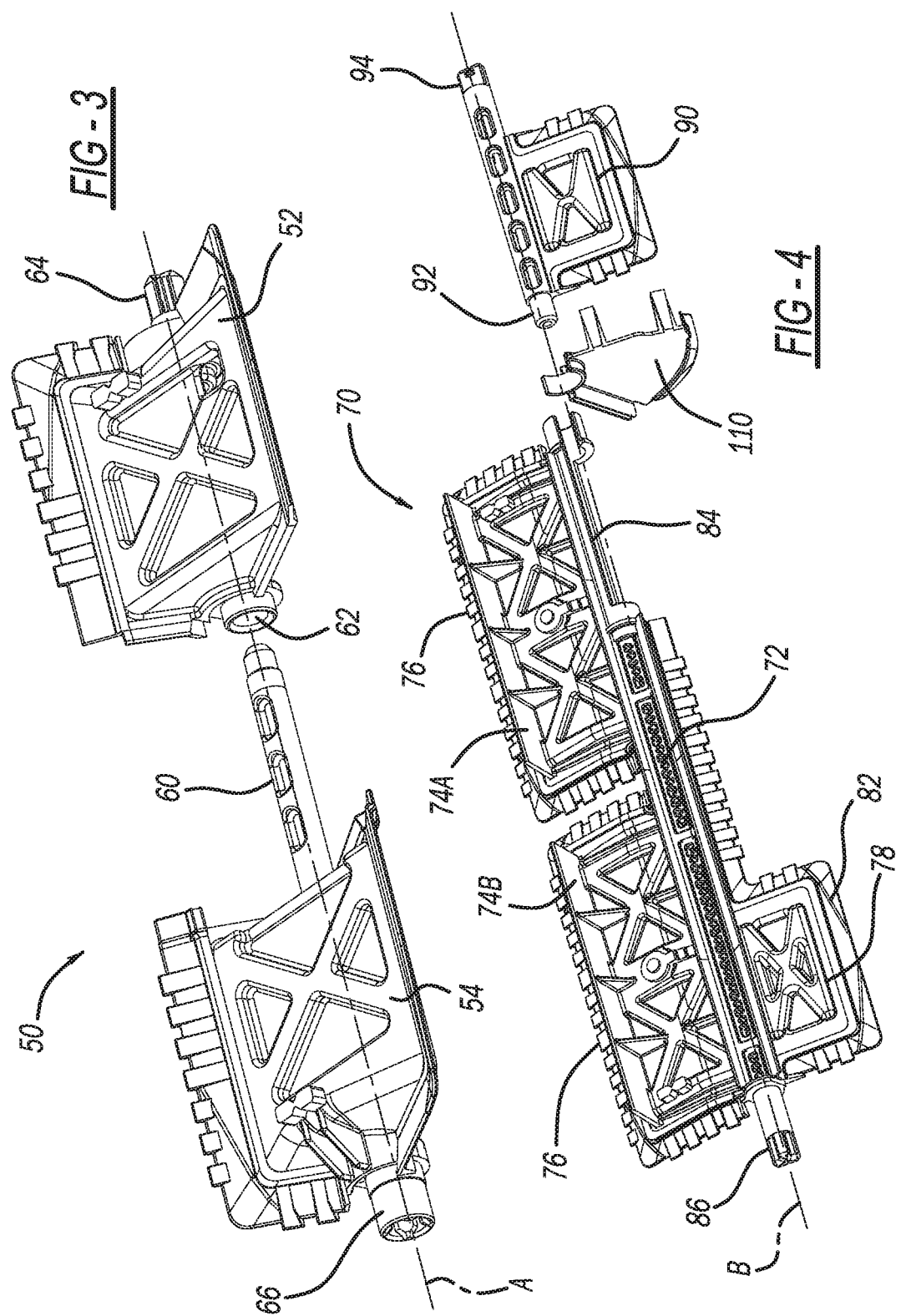

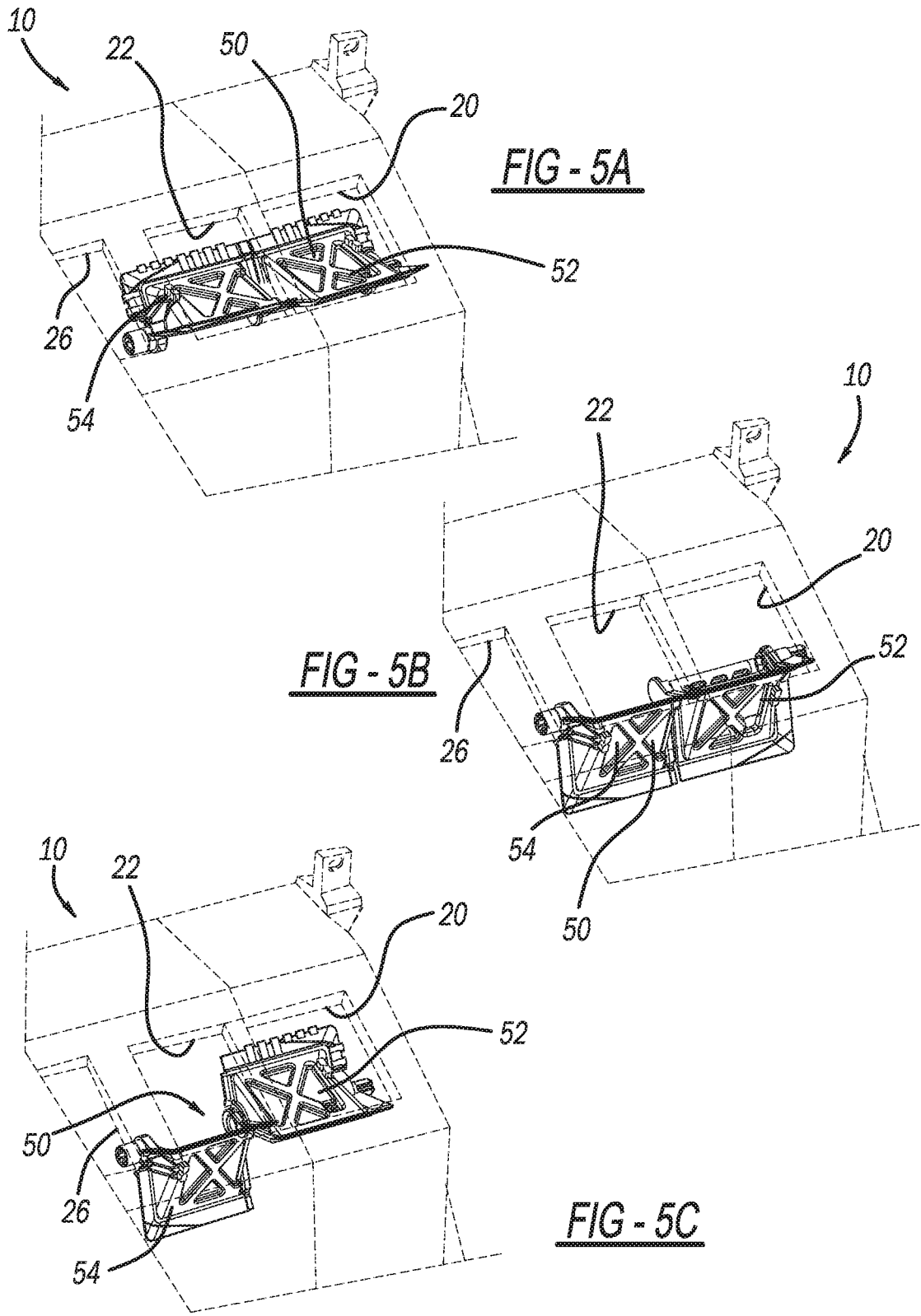

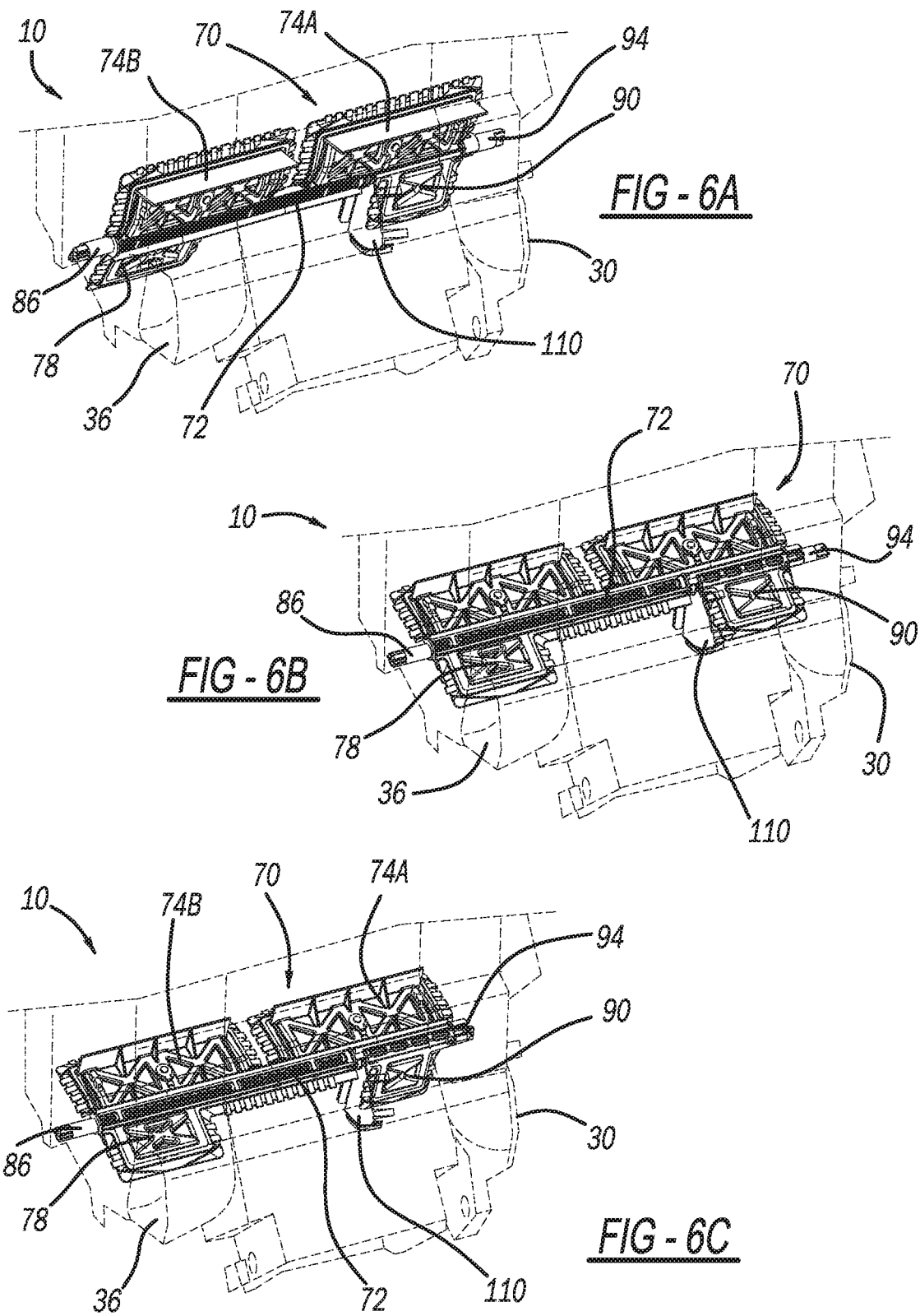

HVAC DRIVER-FOCUS MODE OPERATION MECHANISM

CROSS-REFERENCE TO RELATED APPLICATION

This application claims the benefit of U.S. Provisional Application No. 62/589,799 filed on Nov. 22, 2017, the entire disclosure of which is incorporated herein by reference.

FIELD

The present disclosure relates to a heating, ventilation, and air conditioning (HVAC) airflow distribution module having airflow mode doors that can focus airflow on a driver's seat and maintain entire vehicle recirculation at a comfortable level when no passenger is present in the vehicle.

BACKGROUND

This section provides background information related to the present disclosure, which is not necessarily prior art.

A typical vehicle heating, ventilation, and air conditioning (HVAC) airflow distribution module directs airflow to various different outlets (front and rear face outlets, front and rear foot outlets, defrost outlet and demist outlet). Airflow mode doors open and close according to mode settings thereby controlling the airflow distribution of each one of the outlets mentioned above. While current HVAC systems are suitable for their intended use, they are subject to improvement. For example, current HVAC systems direct airflow to a passenger side of the passenger cabin even when no passenger is present. As a result, more airflow is conditioned than is necessary, which results in various inefficiencies, and may reduce gas mileage and/or waste battery energy. An HVAC system that does not experience such inefficiencies would therefore be desirable. The present disclosure advantageously provides for an HVAC airflow distribution module having airflow mode doors that enables airflow to focus on the driver's seat and maintain the entire vehicle recirculation at a comfortable level when no passenger is present in the vehicle. The present disclosure provides for numerous additional advantages and unexpected results as explained in detail herein and as one skilled in the art will appreciate.

SUMMARY

This section provides a general summary of the disclosure, and is not a comprehensive disclosure of its full scope or all of its features.

The present disclosure includes a heating, ventilation, and air conditioning (HVAC) airflow distribution module for a vehicle. The HVAC airflow distribution module includes: a driver center face outlet defined by the module; a passenger center face outlet defined by the module; a driver side face outlet defined by the module; a passenger side face outlet defined by the module; a driver foot outlet defined by the module; a passenger foot outlet defined by the module; a rear (for occupant at rear) face outlet defined by the module; a driver rear (for occupant behind driver) foot outlet defined by the module; a passenger rear (for occupant behind passenger) foot outlet defined by the module; a defrost outlet defined by the module; a driver window defrost outlet (demist outlet) defined by the module; and a passenger window defrost outlet (demist outlet) defined by the module. A driver face door controls the driver center and side face outlets; a passenger center face door controls the passenger center face outlet; a passenger side face door controls the passenger side face outlet; a main foot door controls the driver and rear foot outlets; a secondary foot door (also called passenger front foot door) controls the passenger front foot outlet only; a defrost door controls the defrost outlet; and a demist door controls the driver and passenger window defrost (demist) outlets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 3 illustrates a passenger center face door and a passenger side face door of the HVAC airflow distribution module of FIG. 1;

FIG. 4 illustrates a main foot door and a passenger front foot door of the HVAC airflow distribution module of FIG. 1;

FIG. 5A illustrates the passenger center face door and passenger side face door in a closed position;

FIG. 5B illustrates the passenger center face door and passenger side face door in an open position;

FIG. 5C illustrates the passenger center face door and passenger side face door in a driver focused mode in which an outer portion (passenger side door) is closed and an inner portion (passenger center door) is open;

FIG. 6A illustrates the main foot door and the passenger front foot door of the HVAC module of FIG. 1 in a closed position;

FIG. 6B illustrates the main foot door and the passenger front foot door of the HVAC module of FIG. 1 in an open position;

Figure 7:
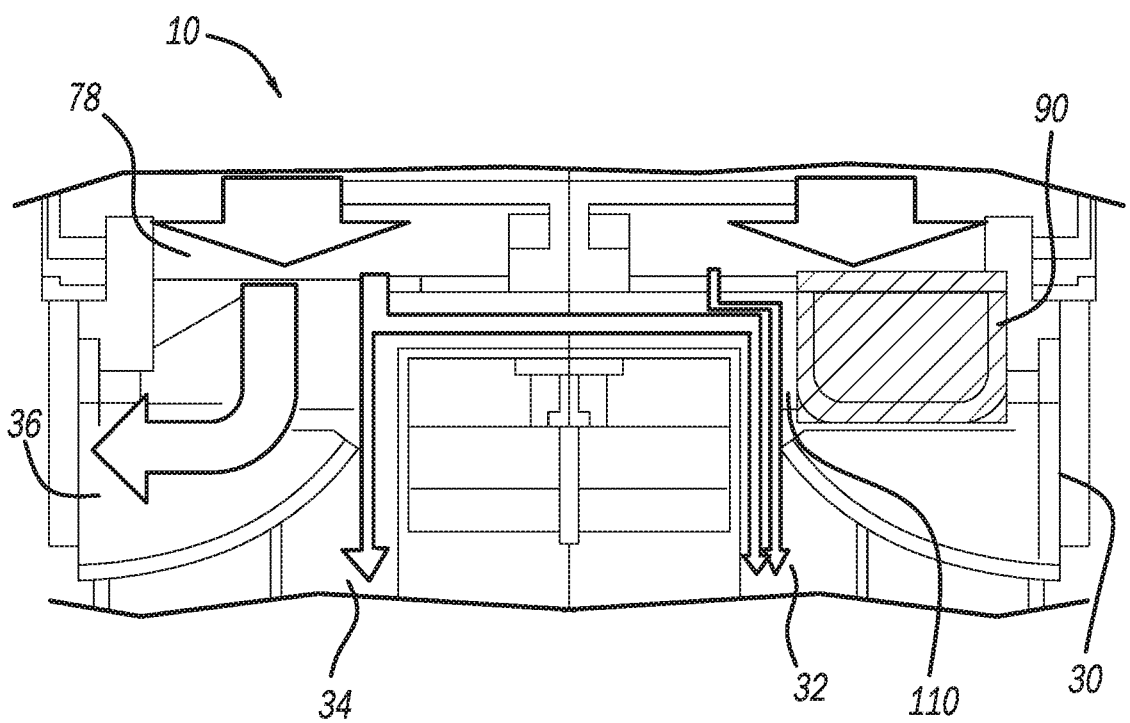

FIG. 6C illustrates the main foot door and the passenger front foot door in a driver focused mode, with a passenger front foot portion thereof in a closed position and a main body portion thereof in an open position; and FIG. 7 illustrates airflow from the HVAC airflow distribution module with the foot door in the driver focused mode of FIG. 6C, such that airflow flows out of the HVAC module through a driver front foot outlet, a driver rear foot outlet, and a passenger rear foot outlet of the HVAC module, and airflow is blocked by the passenger front foot door from flowing out of the passenger front foot outlet of the HVAC module.

Corresponding reference numerals indicate corresponding parts throughout the several views of the drawings.

DETAILED DESCRIPTION

Example embodiments will now be described more fully with reference to the accompanying drawings.

Figure 1:
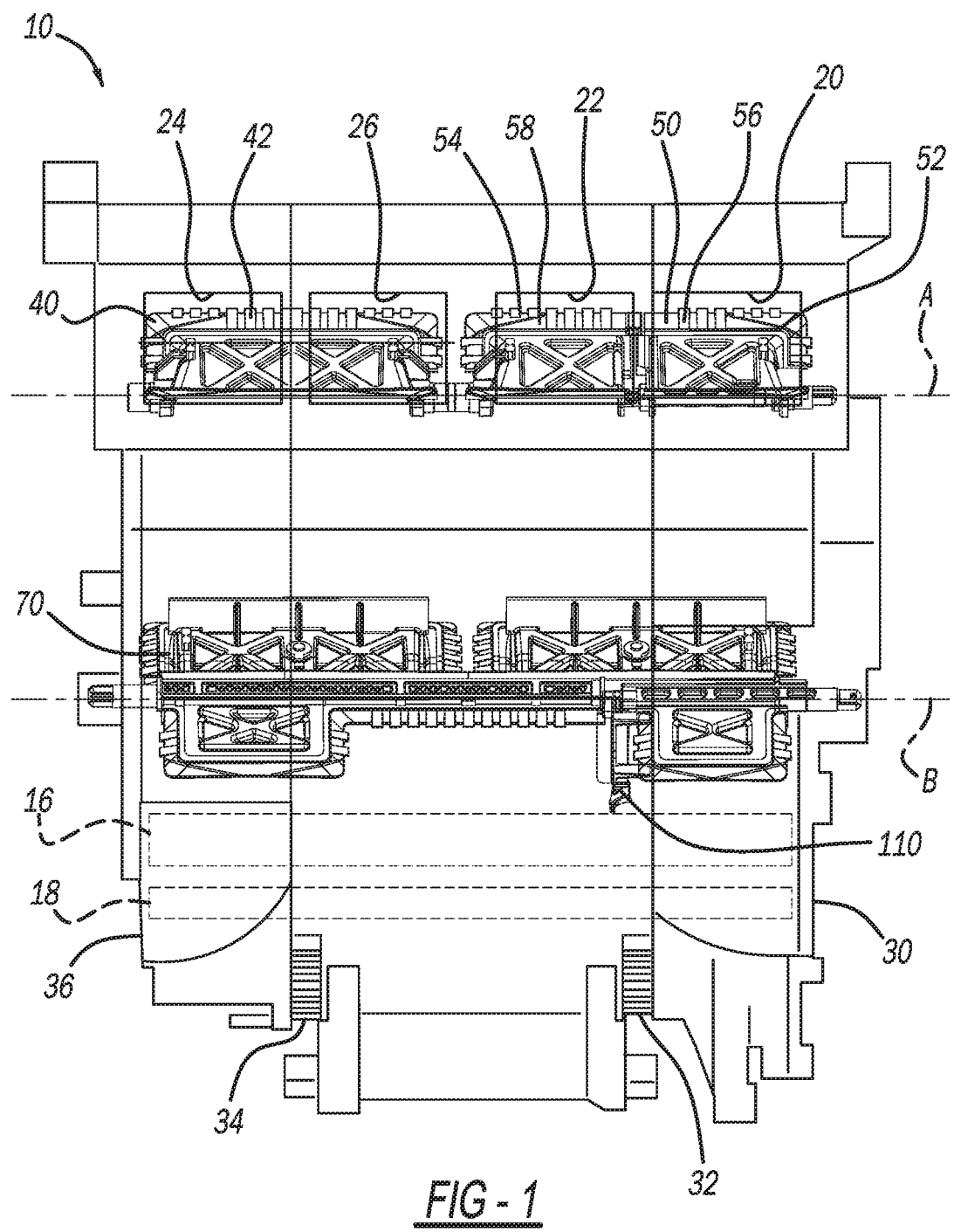
FIG. 1 illustrates an HVAC airflow distribution module in accordance with the present disclosure.
Figure 2:
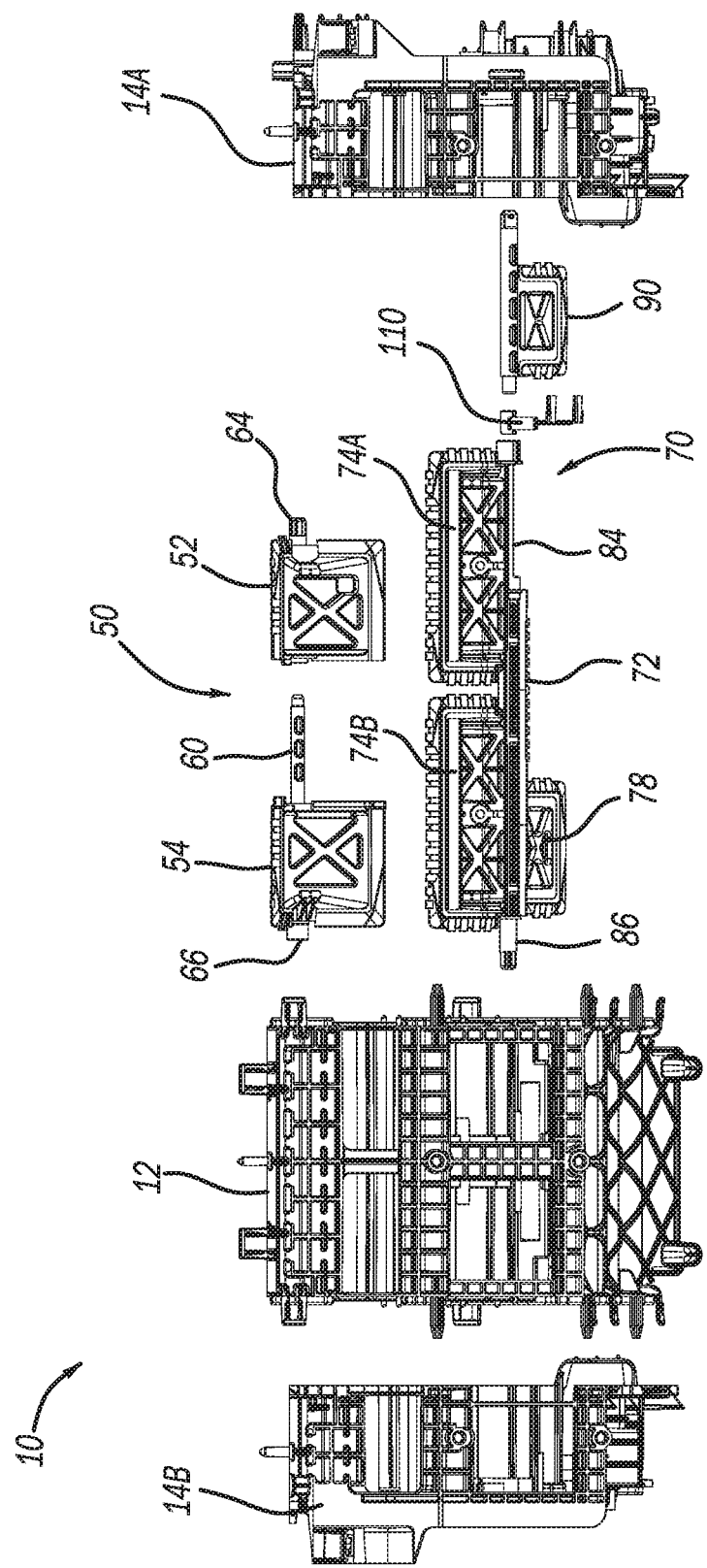
FIG. 2 is an exploded view of the HVAC airflow distribution module of FIG. 1.

With initial reference to FIGS. 1 and 2, a heating, ventilation, and air conditioning (HVAC) airflow distribution module in accordance with the present disclosure is illustrated at reference numeral 10. The HVAC airflow distribution module 10 can be configured for use in any suitable application, such as any suitable vehicle. Exemplary vehicles include the following: passenger vehicles; recreational vehicles; sport utility vehicles; mass transit vehicles; construction vehicles; construction equipment; military vehicles; military equipment; watercraft; aircraft; etc. The HVAC airflow distribution module 10 may also be configured for use with any suitable non-vehicular application. The HVAC airflow distribution module 10 generally includes, as illustrated in FIG. 2, a center distribution case 12. Coupled to sides of the center distribution case 12 are a passenger distribution case 14A and a driver distribution case 14B.

The HVAC airflow distribution module 10 defines various airflow outlets, which are connected to various air ducts that extend throughout the vehicle to deliver airflow to vents at various locations throughout a passenger cabin of the vehicle. For example, the HVAC airflow distribution module 10 defines the following face outlets, which are connected to face vents arranged in the passenger cabin to direct airflow to faces (or upper body areas) of persons within the passenger cabin: passenger side (outer) face outlet 20; passenger center (inner) face outlet 22; driver side (outer) face outlet 24; and driver center (inner) face outlet 26. The passenger side face outlet 20 is connected to a passenger side duct. The passenger center face outlet 22 is connected to passenger center face duct. The driver side face outlet 24 is connected to a driver side face duct. The driver center face outlet 26 is connected to a driver center face duct.

The HVAC airflow distribution module 10 further defines a plurality of foot outlets, which are connected to ducts and foot vents throughout the passenger cabin to direct airflow towards the feet of occupants of the passenger cabin. Specifically, the HVAC airflow distribution module 10 defines the following foot outlets (see FIGS. 1 and 7, for example): a passenger front foot outlet 30; a passenger rear foot outlet for an occupant behind passenger seat 32; a driver rear foot outlet for an occupant behind driver seat 34; and a driver front foot outlet 36. The passenger foot outlet 30 is connected to a passenger front foot duct to direct airflow to the feet of a passenger seated in a front of the vehicle. The passenger rear foot outlet 32 is connected to a passenger rear foot duct to direct airflow to feet of the occupant behind the front passenger seat. The driver rear foot outlet 34 is connected to a driver rear foot duct to direct airflow to feet of the occupant sitting behind the driver. The driver front foot outlet 36 is connected to a driver front foot duct to direct airflow to the driver's feet.

The HVAC airflow distribution module 10 further includes a plurality of doors for controlling airflow through the various outlets of the HVAC airflow distribution module 10. For example and as illustrated in FIG. 1, a driver face door 40 is mounted within the HVAC airflow distribution module 10 at the driver inner and outer face outlets 24 and 26 to control airflow therethrough. The driver face door 40 is mounted such that it rotates about axis A. The driver face door 40 is a one-piece elastomer door, which simultaneously controls airflow through both the outer and inner face outlets 24 and 26 of the driver. The door 40 is thus unable to individually control airflow through the outlets 24 and 26. The driver face door 40 includes a seal 42 extending about a periphery thereof to provide an airtight seal against the sealing surfaces in the HVAC airflow distribution module 10.

With reference to FIGS. 1-3, for example, a passenger face door sub assembly 50 is mounted within the HVAC airflow distribution module 10 at the side and center face outlets 20 and 22 to control airflow therethrough. The passenger face door sub assembly 50 is mounted such that it also rotates about axis A. In accordance with the present disclosure, the passenger face door sub assembly 50 includes a passenger side face door (outer portion) 52 arranged at the passenger side face outlet 20, and a passenger center face door (inner portion) 54 arranged at the passenger center face outlet 22. The passenger side face door 52 and the passenger center face door 54 are independently rotatable about the axis A to individually control airflow through each one of the passenger side and center face outlets 20 and 22. Extending about the outer portion 52 is a seal 56, and extending about the inner portion 54 is a seal 58. The seals 56 and 58 are configured to provide an airtight seal against the HVAC airflow distribution module 10 to restrict airflow through the side and center face outlets 20 and 22 when either one of the passenger side and center face doors 52 and 54 are closed. With particular reference to FIGS. 2 and 3, the center face door 54 includes a support rod 60 extending therefrom, which is seated within a receptacle 62 of the side face door 52.

The passenger side face door 52 further includes a coupling member, such as in the form of a knob 64, which is connected to any suitable actuating mechanism, such as a servo, or a linkage, configured to independently rotate the side face door 52 relative to the center face door 54. As a result, airflow through each one of the side face outlet 20 and the center face outlet 22 can be individually controlled. The inner portion 54 includes a coupling member or knob 66, which is connected to the driver face door 40. The driver face door 40 is rotated by any suitable actuating mechanism such as any suitable servo or linkages. Thus the passenger center face door 54 rotates together with the driver face door 40.

With reference to FIGS. 5A, 5B, and 5C, various operational modes of the passenger face door sub assembly 50 will now be described. FIG. 5A illustrates the passenger face door sub assembly 50 in a normal face-shut off mode, with both the side face portion 52 and the center face portion 54 in closed positions to prevent airflow from flowing through the passenger side face outlet 20 and the passenger center face outlet 22. The passenger face door sub assembly 50 will typically be arranged in this closed position when face airflow is not desirable, such as during a heating mode of the HVAC airflow distribution module 10. FIG. 5B illustrates the passenger face door sub assembly 50 in a normal face-open position to allow airflow through the passenger side face outlet 20 and the passenger center face outlet 22. The passenger face door sub assembly is typically arranged in this open position during a cooling mode in which cool airflow is desired.

FIG. 5C illustrates the passenger face door sub assembly 50 in a driver focused mode in which the passenger side face door 52 of the passenger face door sub assembly 50 is arranged in a closed position, and the passenger center face door 54 is arranged in an open position. The passenger face door 50 sub assembly is typically arranged in this driver focused mode when no passenger is present at the passenger seat of the passenger cabin. Advantageously, airflow is restricted from flowing out of the passenger side face outlet 20 due to the side face door 52 being in the closed position. This prevents airflow from flowing to passenger side face ducts, thereby directing additional airflow through the passenger cabin face outlet 22 and each of the driver face outlets 24 and 26, which improves the efficiency of the HVAC airflow distribution module 10. Improving the efficiency of the HVAC airflow distribution module 10 may advantageously improve vehicle fuel economy and/or increase battery life. The passenger side face door 52 is rotated to the closed position by any suitable actuating mechanism (e.g., servo or linkages) attached to the coupling member or knob 64. The passenger center face door 54 is rotated to the open position by an actuating mechanism (e.g., servo or linkages) that rotates the driver face door 40 as the driver face door 40 and the passenger center face door 54 rotate in unison.

With reference to FIGS. 1, 2, and 4, airflow through the foot outlets 30, 32, 34, and 36 is controlled by a foot door sub assembly 70. With particular reference to FIGS. 2 and 4, the foot door sub assembly 70 includes a main foot door 72 and a passenger front foot portion 90, both of which are mounted within the HVAC airflow distribution module 10 to rotate about longitudinal axis B. The main foot door 72 includes flaps 74, each of which have a seal 76 extending about outer peripheries of the flaps 74 to provide airtight seals with the HVAC airflow distribution module 10. The main foot door 72 further includes a driver front foot flap 78 with a seal 82 extending about an outer periphery thereof. The main foot door 72 defines a receptacle 84, which is configured to receive the passenger front foot door 90 therein to couple the door 90 to the main foot door 72. Specifically, a support rod 92 of the passenger front foot door 90 is seated within the receptacle 84 such that the passenger front foot door 90 is rotatable independently of the main foot door 72. The HVAC airflow distribution module 10 further includes a separator 110. The separator is coupled to, or adjacent to, the foot door sub assembly 70 and arranged between the passenger front foot outlet 30 and the passenger rear foot outlet 32 to restrict airflow from flowing between the outlets 30 and 32.

The main foot door flap 78 and the flap 74 regulate airflow through each one of the driver rear foot outlet 34, the driver front foot outlet 36, and the passenger rear foot outlet 32. The passenger front foot door 90 regulates airflow through the passenger front foot outlet 30.

With additional reference to FIGS. 6A, 6B, and 6C, various different modes of the foot door sub assembly 70 will now be described. The foot door sub assembly 70 is rotated along the axis B to the various different modes. The passenger front foot door 90 is rotated by any suitable actuating mechanism (e.g., servo, or linkages) attached directly or indirectly to coupling member/knob 94. The main foot door 72 is rotated by any other suitable actuating mechanism (e.g., servo, or linkages) attached directly or indirectly to coupling member/knob 86. Thus the passenger front foot door 90 and the main foot door 72 are advantageously rotatable independent of one another to various different mode positions.

FIG. 6A illustrates the foot door sub assembly 70 in a closed position, thereby restricting airflow through each one of the passenger front foot outlet 30, passenger rear foot outlet 32, driver rear foot outlet 34, and driver front foot outlet 36. The foot door sub assembly 70 is typically arranged in this position when the HVAC airflow distribution module 10 is in a cooling mode in which only cool air is directed through the face outlets 20, 22, 24, and 26. FIG. 6B illustrates the foot door sub assembly 70 in an open position, thereby permitting airflow through each one of the passenger front foot outlet 30, passenger rear foot outlet 32, driver rear foot outlet 34, and driver front foot outlet 36. The foot door sub assembly 70 is typically arranged in this position when the HVAC airflow distribution module 10 is in a heating mode in which warm airflow is directed through the outlets 30, 32, 34, and 36.

FIG. 6C illustrates the foot door sub assembly 70 in a driver focused mode in accordance with the present disclosure. In the driver focused mode of FIG. 6C, the main foot door 72 is rotated to an open position to allow airflow through the passenger rear foot outlet 32, the driver rear foot outlet 34, and the driver front foot outlet 36. The main foot door 72 can be open to any suitable degree to permit airflow through these outlets 32, 34, and 36. The passenger front foot door 90 is rotated independent of the main foot door 72 to the closed position illustrated to restrict airflow through the passenger front foot outlet 30. The foot door sub assembly 70 is configured in the driver focused mode of FIG. 6C when no passenger is present at the front passenger of the passenger cabin. This advantageously reduces airflow to the front passenger, and increases airflow through the outlets 32, 34, and 36 to more efficiently provide airflow to the driver and maintain the entire vehicle recirculation at a comfort level, and not waste energy conditioning airflow to the passenger when no passenger is present. Increasing the efficiency of the HVAC airflow distribution module case in this manner provides numerous advantages, such as reducing the amount of energy consumed, which may increase gas mileage and/or conserve battery power.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) airflow distribution module with a driver-focus mode operation mechanism for a vehicle comprising:
    a passenger side face outlet defined by the HVAC airflow distribution module;
    a passenger center face outlet defined by the HVAC airflow distribution module;
    a passenger face door sub assembly movable to independently control airflow through the passenger side face outlet and the passenger center face outlet;
    a passenger front foot outlet defined by the HVAC airflow distribution module;
    a driver front foot outlet defined by the HVAC airflow distribution module;
    a driver rear foot outlet defined by the HVAC airflow distribution module;
    a passenger rear foot outlet defined by the HVAC airflow distribution module; and
    a foot door sub assembly including:
        a main foot door movable to control airflow through the driver front foot outlet, the driver rear foot outlet, and the passenger rear foot outlet; and
        a passenger front foot door movable to control airflow through the passenger front foot outlet;
    wherein the main foot door and the passenger front foot door are movable independent of one another to independently control airflow through the passenger front foot outlet and each of the driver front foot outlet, the passenger rear foot outlet, and the driver rear foot outlet.

2. The HVAC airflow distribution module of claim 1, wherein the face door sub assembly includes:
    an outer portion at the passenger side face outlet movable to control airflow therethrough; and
    an inner portion at the passenger center face outlet movable to control airflow therethrough;
    wherein the outer portion and the inner portion are movable independent of one another.

3. The HVAC airflow distribution module of claim 2, wherein one of the outer portion and the inner portion includes a support rod extending therefrom;
    wherein another one of the outer portion and the inner portion defines a receptacle configured to receive the support rod to connect the outer portion and the inner portion together.

4. The HVAC airflow distribution module of claim 2, wherein the outer portion and the inner portion of the face door sub assembly rotate about a common axis.

5. The HVAC case of claim 1, wherein the main foot door of the foot door sub assembly defines a receptacle configured to receive the passenger front foot door such that the passenger front foot door is independently rotatable relative to the main foot door.

6. The HVAC case of claim 1, wherein the main foot door and the passenger front foot door of the foot door sub assembly are rotatable about a common axis.

7. The HVAC case of claim 1, further comprising a separator within the case between the passenger front foot outlet and the passenger rear foot outlet to block airflow between the passenger front foot outlet and the passenger rear foot outlet.

8. The HVAC case of claim 7, wherein the separator is mounted to the foot door sub assembly between the main foot door and the passenger front foot door.

9. A heating, ventilation, and air conditioning (HVAC) airflow distribution module for a vehicle comprising:
    a passenger front foot outlet defined by the module;
    a driver front foot outlet defined by the module;
    a passenger rear foot outlet defined by the module;
    a driver rear foot outlet defined by the module; and
    a foot door sub assembly including:
        a main foot door movable to control airflow through the driver front foot outlet, the driver rear foot outlet, and the passenger rear foot outlet; and
        a passenger front foot door movable to control airflow through the passenger front foot outlet;
    wherein the main foot door and the passenger front foot door are movable independent of each other to control airflow through the passenger front foot outlet independently of each of the driver front foot outlet, the passenger rear foot outlet, and the driver rear foot outlet.

10. The HVAC airflow distribution module of claim 9, wherein the main foot door of the foot door sub assembly defines a notch on one side of a door bearing as a receptacle configured to receive the passenger front foot door such that the passenger front foot door is independently rotatable relative to the main foot door, the notch is out of a relative operation angle between the main foot door and the passenger front foot door to prevent the passenger front foot door from sliding off the main foot door during normal operation once assembled.

11. The HVAC airflow distribution module of claim 9, wherein the main foot door and the passenger front foot door are rotatable co-axially about a common axis.

12. The HVAC airflow distribution module of claim 9, further comprising a separator within the module between the passenger front foot outlet and the passenger rear foot outlet to completely separate airflow between the passenger front foot outlet and the passenger rear foot outlet.

13. The HVAC airflow distribution module of claim 12, wherein the separator uses a tongue and groove fitting to slide into the center case of the module, and has a bearing feature to support axial rotation of the main foot door of the foot door sub assembly.

* * * * *